Sept. 6, 1966 V. A. HINDS 3,271,586

CHARACTER RECOGNITION CONVERTER

Filed Sept. 7, 1962 3 Sheets-Sheet 1

INVENTOR.
VIRGIL A. HINDS

BY John R. Manning
ATTORNEY

CHARACTER RECOGNITION CONVERTER

Filed Sept. 7, 1962

3 Sheets-Sheet 3

3,271,586
CHARACTER RECOGNITION CONVERTER
Virgil A. Hinds, Farmers Branch, Tex., assignor to Sperry Rand Corporation, New York, N.Y., a corporation of Delaware
Filed Sept. 7, 1962, Ser. No. 221,991
8 Claims. (Cl. 307—88.5)

This invention relates to a converter and more specifically to a character reader for converting the information in printed form upon a document to a second form such as magnetic indicia on tape or drum, punched holes on a tape or card, etc. The circuits of the present invention will accept signals from a correlation network whose inputs were derived from well known character scanning techniques, and convert these signals to a permanent form.

Character reading systems may be subdivided, generally, into four operations. In the first operation, the characters on the character bearing document must be scanned by some type of character scanning device. Known character scanners are of a whirling disk type, cathode ray tubes and television camera tubes. In addition, the exposure of the characters to a row or matrix of photo electric cells may be considered as character scanners.

After the characters are scanned and the character scanner derives an output signal as a result of the character scanning process, the output signals must be processed to derive the information contained in them. A number of known circuits of this type employ frequency selective networks, resistor or diode matrices, or perhaps relay trees. Usually, the signal processor will present different voltages on output conductors from the processor depending upon the degree of correlation between the characters scanned and a plurality of known characters. It is now necessary to select that conductor or signal indicating the highest degree of correlation in order to obtain accurate results. The output of the interpreter now indicates the identity of the character so scanned on the scanning leads. If the identity of the character is to be preserved, some type of storage means must be provided. The storage means may be of a temporary type, a permanent type, or a combination of both.

This invention relates to receiving the signals from a signal processor as derived by a scanning operation, interpreting the signals so read, and storing the signals in one of the known type of storage means.

Accordingly, it is the principal object of this invention to improve character recognition techniques.

It is another object of this invention to improve techniques for converting the information conveyed in a printed or written character to other forms.

It is a further object of this invention to provide an electrical means for detecting the signal generated by a correlation network and converting the signal to permanent storage.

It is a still further object of this invention to provide a circuit for transferring character data from a temporary storage means to permanent means.

In its broadest aspect, the present invention contemplates a circuit which is coupled to a signal processor such as a correlation matrix which has received input signals from a character scanning device. This circuit, which may be termed an "interpreter" circuit, permits an output signal on one of the character output lines which is indicative of the particular character scanned by the scanning means. Means are also employed to detect any error conditions such as the selection of more than one character output line. The output signal from the character output line is then transferred to a temporary storage means known as a "column buffer." In the embodiment shown, the temporary storage means may be silicon controlled rectifiers (SCR). There are as many SCR's in each column buffer as there are characters to be recognized. In the case of a card or paper tape punching operation, there are as many column buffers as there are columns to be punched at one time. Means are employed to sense and determine if more than one SCR in a column has been selected or if no SCR has been selected. In a second embodiment of the recording means, the outputs from the column buffers would be directed to a decimal to binary converter and then to a magnetic storage means such as magnetic tape or a drum.

Further features and objects of the invention will be found throughout the more detailed description and a better understanding of the invention will be afforded by the following detailed description considered in conjunction with the accompanying drawings in which.

Figure 1:
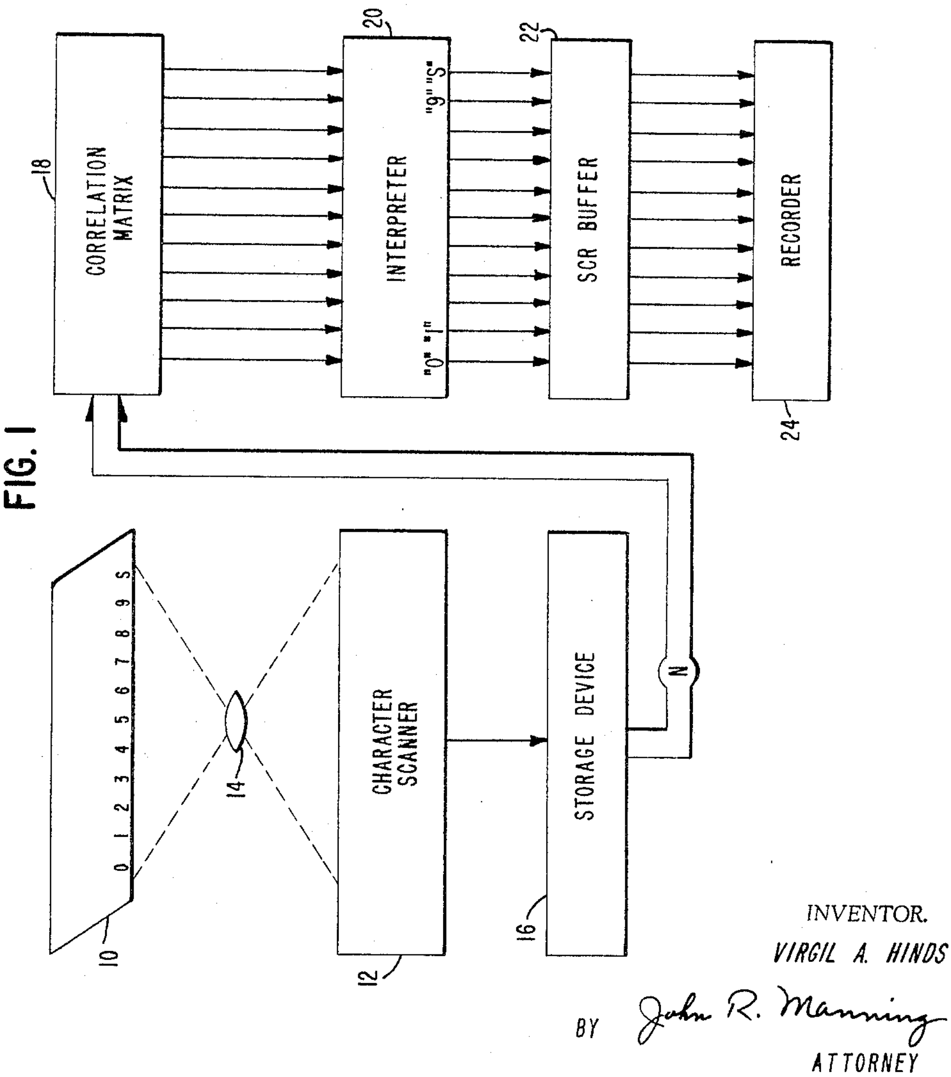
FIGURE 1 is a simplified block diagram of a system employing the invention.

Before discussing the invention in detail, reference is had to the FIGURE 1. The document 10, having any of the characters 0 through 9, plus any other symbols designated by "S," is exposed to the character scanner 12 through a lens or other means 14. The character scanner 12 may be of almost any of the types known in the art, but for the purposes of illustration, it will be assumed that the scanning apparatus is of the type which utilizes a television camera tube.

The character scanner 12, in scanning a series of characters to be read, produces an output "video" signal consisting of two voltage levels only, indicating respectively the presence of "black" (a portion of a character image) or "white" (background) under the scanning beam at any particular point in time. This video signal, gated by a series of clock pulses, is applied to the input of a storage device 16 which may be one of the well known shift registers. The shift register is "stepped" or "shifted" by clock pulses corresponding to the gating or pulsing of the video signal so that the entire train of pulses produced by the scanning of a given character can be sequentially placed in the shift register as it is produced by the character scanner 12.

In parallel connection with the storage device 16 is a correlation matrix 18 consisting of input conductors from the various stages of the storage device 16 and output lines representing each of the characters to be identified by the system. Such a storage device and correlation matrix may be of the type disclosed in copending application Serial No. 107,488 filed May 3, 1961, entitled "Character Reading Apparatus."

The character output lines of tthe correlation matrix 18 are applied each to an individual storage capacitor in the interpreter 20. As the string of video pulses representing the particular character scanned passes through the storage device 16, there will occur at some point a correlation or registration between the video pulse train and one of what may be called the "stored pulse trains" effected by the particular configuration of the correlation matrix 18. During the travel of the video pulse train down the storage device 16, varying output voltages (corresponding to the degree to which the video pulse train matches the various stored pulse trains) will be produced on each of the output lines of the matrix 18, and, as the storage capacitors in the interpreter 20 "remember" the highest voltages applied to them during the passage of the video pulse train, it may be appreciated that the character scanned may be identified by determining which of the storage capacitors had highest voltage impressed thereon during the passage of video pulse train, since, as will be seen later, the highest output voltage occurs on the output line associated with the stored pulse train most nearly matching the unknown pulse train. When the character scanned has thus been recognized, an output circuit is energized which causes the corresponding character to be recorded in the silicon controlled rectifier buffer 22. The SCR buffer 22 is capable of temporarily storing the identity of a large number of scanned characters and transferring this information in parallel, to a recording device 24. If the recording device 24 is a punched card, or in many instances, the same card or document 10 upon which the characters are imprinted, an entire field may be punched in one operation. Thus, the operation will be to automatically read the number printed on a document 10 and accordingly prepare a punched card containing the same number. Other adaptations of the invention are immediately apparent (preparing punched tapes, duplicate printed cards, preparing magnetic tapes, transferring the information to the magnetic drum, transferring the information to a magnetic core storage device, operating a typewriter, reading numerals or digits from sheets of text instead of cards, etc.) and it should be emphasized that the particular application shown in this description is for the purposes of illustrations only and should not be construed as limiting the scope of the invention. The particular invention concerns interpreting the output conductor from the correlation matrix 18 which has the highest voltage impressed thereon by the interpreter 20, temporarily storing this information in a buffer unit 22 for transferral to a permanent storage means 24.

Figure 2:
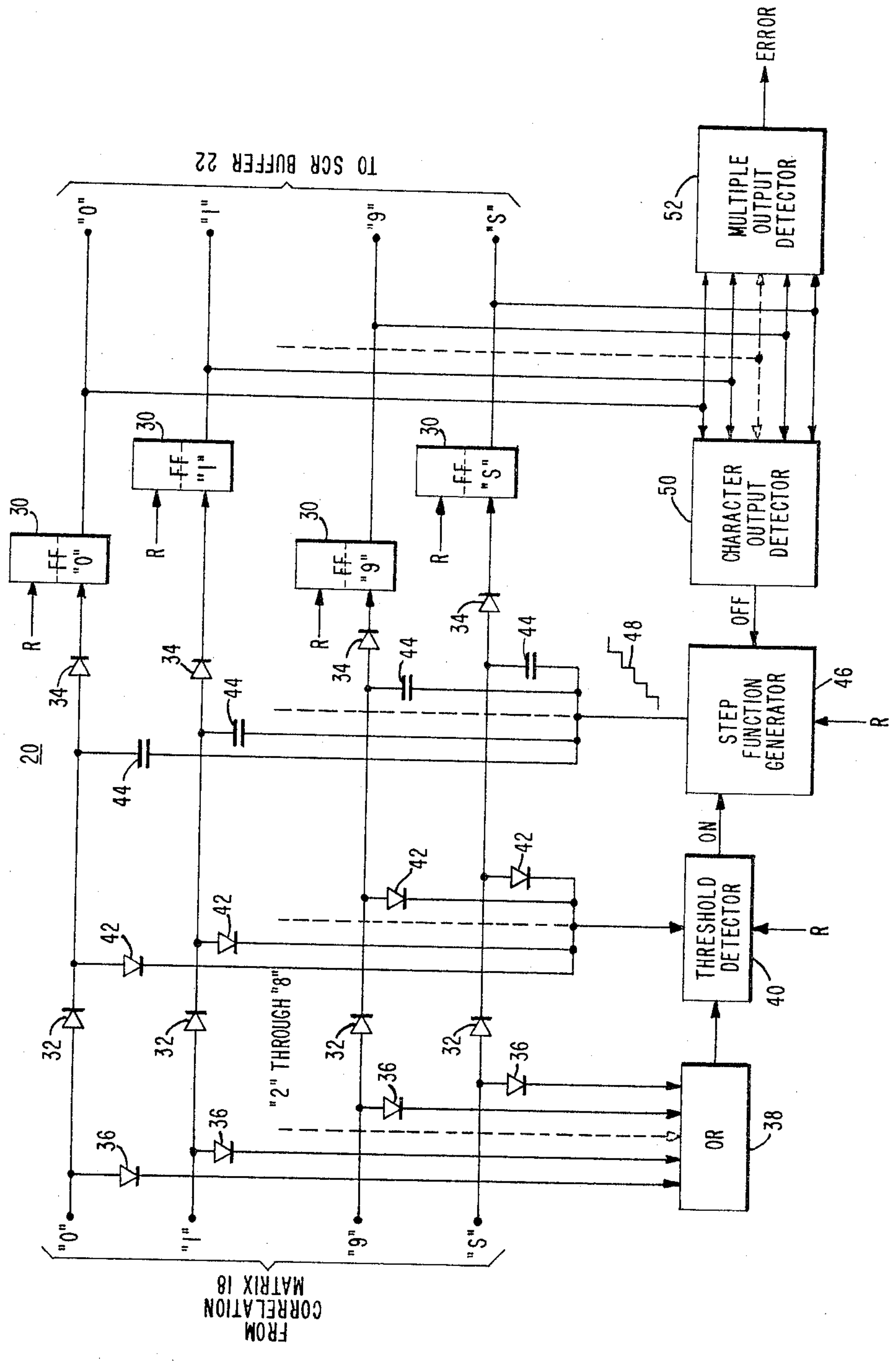
FIGURE 2 is a schematic and blocked diagram of the interpreter circuit for detecting the proper character output line.

Turning now to the consideration of the invention in detail, it will be seen in the FIGURE 2 that signals are supplied from the correlation matrix 18 to the interpreter 20 via the conductors labeled "0" through "9" and any other symbol designated "S." The "0" conductor is coupled to its associated flip-flop 30 through the series diodes 32 and 34. The "0" conductor, as stated, is coupled to the digit side of the flip-flop 30 whose output is directed on the "0" conductor to the SCR buffer 22. In a similar manner, the other conductors are coupled to their associated flip-flops 30 through the series diodes 32 and 34. Connected to each of the character lines, and poled to pass positive pulses, are the diodes 36 whose outputs are directed to the OR circuit 38. The output of OR circut 38 is directed to a threshold detector 40. The function of the diodes 36 and the OR circuit 38 is to conduct the varying output voltages from the correlation matrix 18 to the threshold detector 40.

Also connected from each of the character conductors and between the diodes 32 and 34 are the diodes 42. The threshold detector 40 may be any type of amplifier which will provide a back bias to the diodes 42 by the application of predetermined voltage level to its input. In operation, the varying voltages from the correlation matrix 18 will increase with time as the characters are scanned. A short time before completion of the scan, the voltage on one of the character lines through the OR circuit 38 to the threshold detector 40, will be sufficiently high to cause the threshold detector 40 to back bias the diodes 42. Normally, the diodes 42 provide a discharge path so that the capacitors 44 will not charge sufficiently high enough to trigger their associated flip-flops 30. However, near the end of the scanning cycle, a "threshold" will be reached so that the threshold detector 40 applies a back bias on the diodes 42 and thus blocks the discharge path for the capacitors 44 and causes the capacitors 44 to charge to the voltage applied to their associated character input line. The capacitors 44 are coupled from each of the character input lines between the diodes 32 and 34, in parallel with the diodes 36 and 42. The other terminal of the capacitors 44 is connected to a step function generator 46. The step function generator 46 may be of a type commonly known in the art which is capable upon command, of providing a stair step output voltage wave form such as shown at 48. The number of voltage increments applied to the capacitors 44 to trigger the associated flip-flops 30 is dependent upon the voltage generated on the output lines from the correlation matrix 18 and the value of each increment may be approximately ¼ or ½ volt.

Individually coupled to each of the character output conductors from the flip-flops 30, is a character output detector 50 and a multiple output detector 52. The function of the character output 50 is to apply a signal to the step function generator 46 to turn off the generator 46 as soon as one of the flip-flops has been triggered and indicates on its output conductor to the SCR buffer 22 that a character has been recognized. Also connected to the output conductors from flip-flops 30 is the multiple detector output detector 52 whose function is to indicate an error condition if two or more output lines are energized. The circuit of the multiple output detector 52 is such that the voltage supplied by a single output conductor will not actuate the multiple output detector 52 to indicate an error condition; however, the voltage supplied by two or more output conductors is sufficient to actuate the multiple output detector 52 and thus indicate an error condition. The character output detector 50 and the multiple output detector 52 may be conventional amplifiers which are biased to conduct at a predetermined input voltage level.

After the OR circuit 38 has supplied a voltage of sufficient magnitude to indicate that "threshold" has been reached, the threshold detector 40 will back bias the diodes 42 and thus block the discharge path of the capacitors 44. The capacitors 44 will now charge to the potential appearing on their associated character output line. The output from the threshold detector 40 will also cause the step function generator 46 to conduct and apply voltages in parallel to the capacitors 44. Since the capacitors 44 were all charged to different potentials, one of the capacitors 44 will reach a potential before the other capacitors 44, which potential is sufficient to change the capacitor's associated flip-flop 30 from its reset state to its character or digit state and thus provide a potential on one of the output lines "0" through "S." As soon as a voltage appears on one of the output lines to the buffer 22, the character output 50 will provide an output to turn off the step function generator 46. In addition, the multiple detector 52 is monitoring the output conductors to determine if more than one output line has been energized. The elements of the FIGURE 2 are then reset at the appropriate time.

Figure 3:
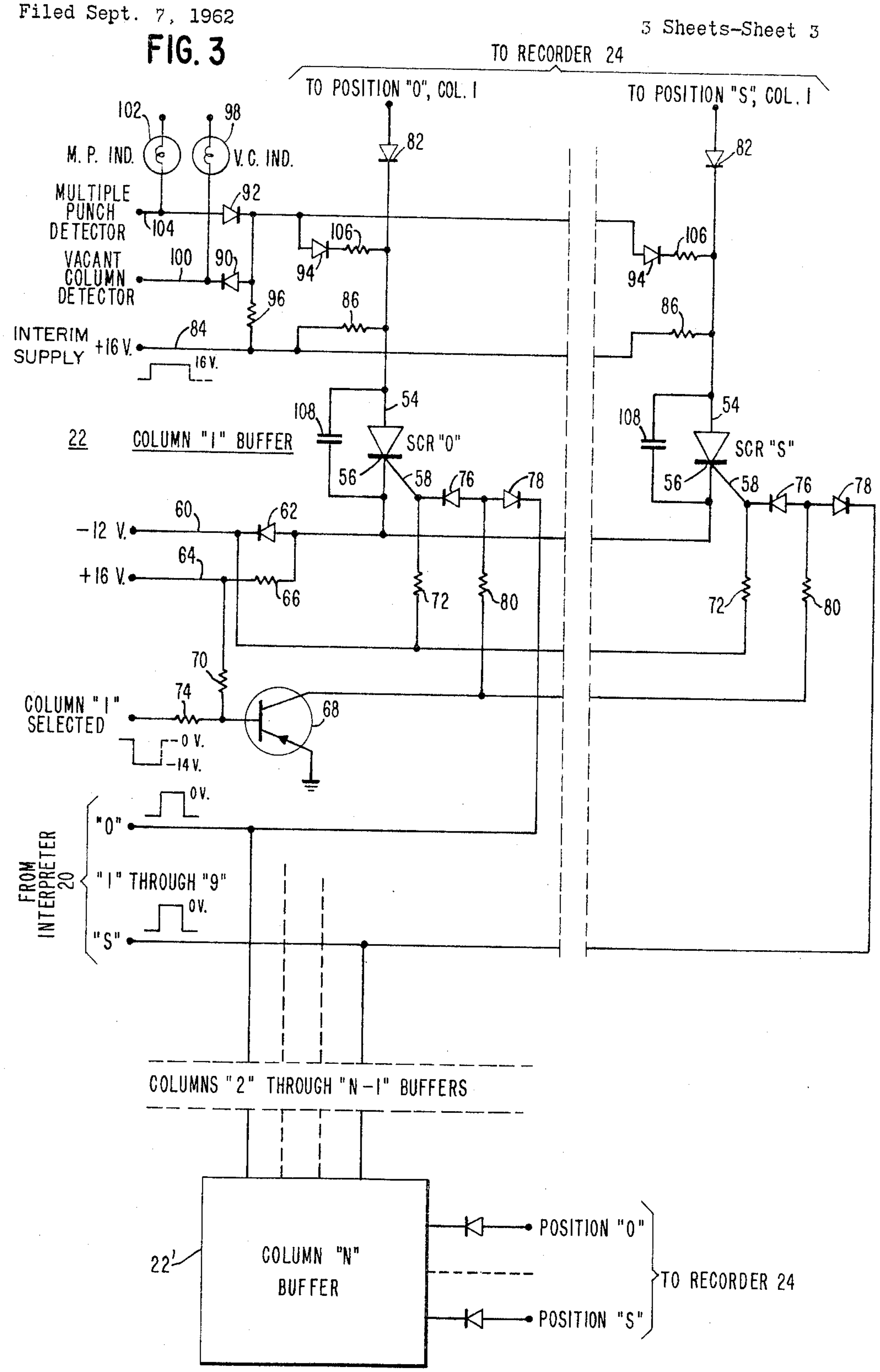
FIGURE 3 is a detailed diagram of the temporary storage means.

As shown by the FIGURE 3, each of the column buffers 22 comprises a plurality of silicon controlled rectifiers equal in number to the characters to be identified, i.e. one SCR (Silicon Control Rectifier) per character. In addition, there are as many column buffers as there are fields to be punched, for example in a punched card recorder. Thus, if it is desired to recognize a total of 40 characters, and punch a field of 25 columns, then each column would comprise 40 silicon control rectifiers and there would be 25 buffers, one column buffer for each of the 25 columns to be punched simultaneously.

In the FIGURE 3, each of the SCR's comprises an anode 54, a cathode 56 and a gate electrode 58. The SCR's are semiconductor devices consisting of alternate zones of P and N types of semiconducting materials located contiguous to each other so as to present an odd number of P-N junctions which provide a controllable uni-directional conducting device. Such semiconductor devices will conduct in response to a turn-on or gate signal of a relative low value applied to the gate element of such a device. Further, such devices, after being biased into a non-conducting state by the application of a turn-off or blocking signal, can recover quickly and conduct again in response to a further turn-on or gate signal. The operation of the silicon control rectifier is discussed in column 2 of the patent to Gutzwiller, No. 3,040,270.

In the FIGURE 3, a negative potential, for example −12 volts, is applied to the conductor 60 and to the cathode of the diode 62. The anode of the diode 62 is coupled to the cathodes 56 of each of the SCR's in the associated column buffer. In addition, a positive potential, such as +16 volts from the conductor 64, is applied to the anode of the diode 62 and also to the cathodes 56 of the associated rectifiers, through the resistor 66. Also, the positive potential is applied to the base electrode of the transistor 68 through a resistor 70. The negative potential on the conductor 60 is also coupled to the gate electrodes 58 of each of the rectifiers through the resistors 72. Also connected to the base of the transistor 68 through a resistor 74 is the column "1" selected line via which a signal of −14 volts is applied if column "1" is to be selected. The emitter of the transistor 68 is connected to ground, as shown.

Connected to the gate electrodes 58 of each of the rectifiers are the diodes 76 and 78. The diodes 76 and 78 are connected anode to anode and one of the cathodes is coupled to the gate electrode 58. To the other cathode of the pair of diodes, namely, the cathode of the diode 78, is coupled the character input conductors "0" through "S" from the interpreter 20, shown in detail in the FIGURE 2. The input conductors to the diodes 78 from the interpreter 20 are normally at a negative voltage and when the particular conductor has been selected, that conductor will rise to approximately zero volts as shown on the character input lines. The output on the collector of the transistor 68 is connected to the center point (the anode to anode point) of the diodes 76 and 78 through the resistors 80. Each of the character input conductors from the interpreter 20 is connected to additional column buffers 22 as shown in the FIGURE 3.

The anode 54 of each of the silicon controlled rectifiers is connected to the recorder 24 through the diodes 82, which diodes 82 have their cathodes coupled to the anode 54. If the particular position in a column has been selected by the application of the potentials to the gate electrodes 58, then the particular SCR which has been selected will provide a discharge path when positive potentials are applied to all of the diodes 82, which potential is not shown but would be supplied from the recorder 24 to cause, for example, the actuation of a punch relay which results in punching a hole in a card.

A positive interim supply is applied to the anodes 54 of each of the rectifiers on the conductor 84 through the resistors 86. In addition, the circuit provides means for detecting if two or more rectifiers have been selected or if no rectifier has been selected in the column.

The positive potential on the conductor 84 is supplied to the diodes 90, 92 and 94 through the resistor 96. The anode of the diode 90 is connected to the resistor 96 and the cathode of the diode 90 is coupled to the vacant column indicator light 98 and to the vacant column detector conductor 100. The cathode of the diode 92 is coupled to the resistor 96 and the anode of the diode 92 is connected to the multiple punch detector indicator light 102 and to the multiple punch detector conductor 104. The vacant column detector 100 and the multiple punch detector conductor 104 may be directed to the driving means of the character scanner in order to halt the operation if such is decided.

The anodes of the diodes 94 are connected to the resistor 96 and the cathodes of the diodes 94 are coupled to the output conductors to the recorder 24 through the resistors 106.

The operation of the multiple punch detector 104 and the vacant column detector 100 consists of detecting the voltage developed across the resistor 96 due to the current through the resistors 106. The current through the resistors 106 will vary depending upon the number of SCR's that are in the conducting mode and, therefore, allowing current to pass through the resistors 106. If no SCR's are in conduction, then there is no current path through the resistor 96 and the vacant column detector 100 will sense that no voltage has been developed and the proper controls will be enabled to indicate a vacant column. If two or more SCR's are in conduction, then more than one current path is provided through a plurality of resistors 106 and the current due to two resistors 106 in parallel, develops a larger voltage across resistor 96 and provides a multiple punch indication on the conductor 104. If only one SCR is enabled, then a smaller voltage is developed across the resistor 96 and neither the multiple punch detector 104 nor the vacant column detector 100 sense an error condition.

The capacitors 108 are shown as coupled across the anode to cathode terminals of each of the silicon control rectifiers to protect the SCR in case of transient voltages which may be generated on the output conductors in the recorder 24 as a result of punch solenoids being activated or deactivated.

Figure 4:
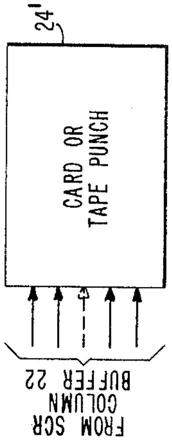
FIGURE 4 is one embodiment of the permanent storage means.

As shown in the FIGURE 4, information temporarily stored in the SCR buffers 22, may be permanently recorded in a card or tape punch of a conventional type such as shown at 24'. If magnetic storage such as magnetic tape or magnetic drum storage is desired, then the outputs from the buffers 22 would be directed to the decimal to binary converter 110 of the FIGURE 5 to prepare the signal for binary notation for recording by the magnetic storage means 24''. The decimal to binary converter 110 may be of a type commonly known in the art.

The operation of the circuit will be described. As indicated earlier, and by reference to the cited copending application, the character conductors "0" through "9" and "S," from the correlation matrix 18 to the FIGURE 2, will have varying voltages applied thereto according to the degree of correlation obtained between the characters scanned and the "stored" waveform of the correlation matrix. The varying voltages are applied to the OR circuit 38 of the FIGURE 2 through the diodes 36. In addition, the diodes 42 to the threshold detector 40, provide a discharge path for the capacitors 44 before generating the threshold signal. Near the end of the scanning of a particular character, the voltage on one of the character conductors will be sufficient to cause conduction of the threshold detector 40. With the threshold detector 40 now in a conducting state, the discharge path for the character conductors through the diodes 42 is blocked and the capacitors 44 will charge to the value of their associated character conductor. At the same time, or a short time later, the "on" signal from the threshold detector to the step function generator 46 will cause the stair step voltage 48 to be applied to all of the capacitors 44. It will be evident that the capacitor having the highest charge stored therein before application of the stair step voltage 48 will reach a potential before the other capacitors, which is sufficient to cause its associated flip-flop 30, through the diodes 34, to be triggered to its output state. As soon as one of the flip-flops 30 has been placed in its output state, a signal to the character output detector 50 will turn off the step function generator 46 and at the same time, the multiple output detector 52 is monitoring the character output conductors to the SCR buffer 22 to insure that only one character output conductor has been selected. As stated herein before, if two or more output conductors are selected, then an error condition exists and the multiple output detector 52 will be responsive to this condition and thus indicate an error.

As shown in the FIGURE 3, a negative voltage is supplied to the conductor 60 and a positive voltage to the conductor 64. It will be noted that the negative potential on the conductor 60 is applied to the cathode of the diode 62 and to the gate electrode 58 of the SCR's through the resistors 72. Further, it will be noted that the positive potential on the conductor 64 is supplied to the anode of the diode 62 and the cathode 56 of the SCR's through the resistor 66. With this arrangement, a small current flows through the diode 62 and since the diode 62 is in its forward conduction state, substantially all of the voltage drop is developed across the resistor 66 except for the small IR drop across the diode 62. In the particular embodiment of this invention that was constructed and operated, about one-half a volt was developed across the diode 62. Due to the circuit arrangements hereinbefore described, this one-half volt developed across the diode 62 is utilized to elevate the voltage of the cathodes 56 of the SCR's 56 about one-half volt more positive than the voltage on the gate electrodes 58.

For the purposes of this discussion, we will assume that the column "1" buffer 22 is to be selected and that the "0" conductor from the interpreter of FIGURE 2 has indicated that the digit "0" has been scanned by presenting an output voltage from its associated flip-flop 30 to the "0" conductor of the FIGURE 3. Immediately prior to the voltage appearing on the "0" input conductor, the interim supply voltage is applied to the conductor 84 of the FIGURE 3. This positive potential of the conductor 84 is coupled to all the silicon controlled rectifiers' anodes 54 through the coupling resistors 86. Thus, it may be said that the SCR's have been "conditioned" and that the subsequent application of a voltage to one of the gate electrodes 58 by the application of a pulse on the character input digits, will provide a discharge path through the diode 82, which is connected in the output circuit to the recorder 24.

After the interim supply voltage has been applied to the anodes 54 as indicated, the timing is such that the potential on one of the character input conductors suddenly rises from a minus voltage to approximately zero volts. Normally, character input conductors from the interpreter 20 are at some potential less than zero volts and will rise to approximately zero volts when a particular character conductor has been selected. At about the same time as the voltage signal appears on one of the input conductors, the transistor 68 is turned on by the application of a negative signal to the column "1" selected conductor coupled to the resistor 74. When the transistor 68 is in its "off" state, its collector is at about −12 volts through the coupling from the conductor 60; however, with the transistor 68 now in its "on" condition, the collector of the transistor 68 goes to approximately ground potential and a current path is established through the resistor 80. The current which passes through the resistor 80 can now assume either of two path directions, according to whether the input signal has appeared on its associated character input line from the interpreter 20. In the particular case under discussion, we will assume that the "0" character line has been selected and the current path to the resistor 80 continues through the diode 76, to the gate electrode 58 of SCR "0," through the gate electrode 58 to the cathode 56, and through the diode 62 to the conductor 60 and the negative potential applied thereto. In effect then, the point between the diodes 76 and 78 is clamped slightly negative with respect to cathode potential of the SCR. If the "0" character line has not been selected, then the alternate path of current through the resistor 80 is assumed which is through the diode 78 and to the negative potential which is the normal state of a character line when it is not indicating that that particular character line is to be selected. Thus, if the particular line has not been selected, the diode 78 will conduct and inhibit the current from flowing through the diode 76 and thus prevent actuation of the particular SCR to which it is coupled. The current will flow through the diode 78 because the cathode of the diode 78 is at a more negative potential than the junction between the diodes 76 and 78.

If a particular SCR has been put into the conduction state, then the voltage on the anode 54 of the particular SCR will approach, in the particular example cited, −12 volts. This means that a current path is established for the punch solenoids (not shown) in the recorder 24 when they are actuated through the diode 82, as described supra. The punches are actuated whenever the diodes 82 are "strobed" (by means not shown) to determine the particular SCR that has provided a current path by being selected as representative of that character which has been scanned. This current path condition continues until the recorder 24 solenoids have been enabled.

After the particular SCR has been selected, the multiple punch detector 104 and the vacant column detector on the conductor 100 are operative to perform their respective functions by sensing the voltage developed across the resistor 96. The operation of the circuits comprises detecting the voltage developed across the resistor 96 due to the current through the resistors 106. The magnitude of this current will vary depending upon the number of SCR's that are in the conducting mode. If there are no SCR's in the conducting mode, then no current path exists through the resistor 96 and the vacant column detector coupled to the conductor 100 is able to sense that no voltage has been developed and the proper controls are enabled to indicate a vacant column. Such an indication may be indicated by the vacant column indicator light 98. If two or more SCR's are in conduction, then more than one current path is provided through the resistors 106 and the current due to two resistors 106 in parallel develops a larger voltage across the resistor 96 and actuates the multiple punch indicator. The condition may be exhibited visually by the multiple punch indicator light 102. If only one SCR is enabled, then a smaller voltage is developed across the resistor 96 and neither the multiple punch detector coupled to the conductor 104 nor the vacant column detector 100 senses an error.

Thus, there has been described the operation wherein the SCR "0" of the column "1" buffer has been selected and where it has not been selected. It will be understood that the remaining SCR's operate in a similar manner and that under normal conditions one SCR of a particular column buffer would be selected. It will be further understood that there are as many column buffers 22 as there are columns to record at one time.

Figure 5:
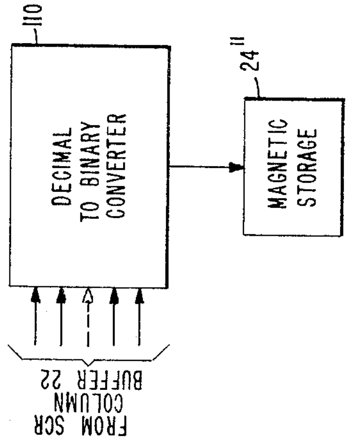
FIGURE 5 is a second embodiment of the permanent storage means.

As previously stated, the circuits of FIGURES 4 and 5 will accept the outputs from the SCR buffers 22 and record the information according to the equipment contained therein. The FIGURE 4 block diagram may be a conventional card or tape punch and the FIGURE 5 magnetic storage may be a magnetic tape, drum, disk or other. It will be understood that before recording directly from the buffers 22 to magnetic storage 24″ the value so represented must be converted to the binary notation suitable for magnetic storage. This will be performed by the decimal to binary converter 110, of conventional design.

It will now be apparent, in accordance with the invention, there has been shown and described a converter which is capable of converting information displayed from one form to a second form. More specifically, the invention comprises the reading of a character bearing document, the reader supplying characteristic output signals to a means for determining the signals and recording the information contained in such signals on a second form such as a card, tape, or other. More specifically, the invention includes an interpreter circuit for detecting the voltage on the character output line corresponding to the character so scanned, establishing an interim supply voltage on the anode of a silicon controlled rectifier and selecting a particular silicon controlled rectifier corresponding to the character so scanned. Means are provided to strobe the rectifiers for determining which of these devices has been placed in its conductive state. The column buffers comprising the plurality of temporary storage devices (the silicon controlled rectifiers) provide a means for transferring the output from the interpreter circuit to the permanent form of recording.

The invention may be embodied in other specific forms without departing from the spirit and essential characteristics thereof. The present embodiment is, therefore, to be considered in all respects as illustrative only with the scope of the invention being indicated by the appended claims rather than the foregoing description, and all changes which come within the meaning and range and equivalency of the claims are therefore intended to be embraced therein.

What is claimed is:

1. A column buffer storage means comprising a plurality of parallel connected silicon controlled rectifiers, means for supplying an interim supply voltage to the anodes of all of said rectifiers, means to apply biasing potentials to the gates and to the cathodes of said rectifiers wherein said cathodes are more positive with respect to the gate potentials but negative with respect to the interim supply voltage on the anodes, a first circuit and a second circuit coupled to the gate of each of said rectifiers and in parallel with said biasing potentials, means included in said first circuit establishing a current path through said rectifier to turn it on when said second circuit is at a first predetermined potential and diverting and maintaining the current path through said second circuit when said second circuit is at a second predetermined potential.

2. The circuit as defined in claim 1 including means coupled to all the anodes of said rectifiers of said storage means to detect and indicate if a current path has not been established through any of the rectifiers.

3. The circuit as defined in claim 1 including means coupled to all the anodes of said rectifiers of said storage means to detect and indicate if a current path has been established through two or more rectifiers.

4. The combination as defined in claim 1 wherein said first circuit is common to all of said rectifiers of said storage means and said second circuit is individual to each of said rectifiers.

5. A circuit comprising a silicon controlled rectifier, means for applying a holding potential to the anode of said rectifier, means for applying biasing potentials to the gate and the cathode of said rectifier wherein the cathode is more positive with respect to the gate potential but negative with respect to the potential applied to the anode, a bistable device and a current driver coupled to the gate electrode, and means for controlling the bistable device to establish a first current path from said current driver through said rectifier when said bistable device is in a first state and to establish a second path from said current driver to said bistable device when said bistable device is in a second state.

6. The circuit as defined in claim 5 wherein said current driver is a transistor amplifier, 7. A buffer storage device, comprising in combination:
- a silicon controlled rectifier having a cathode, anode and gate electrode,
- means biasing said cathode positive with respect to said gate electrode and negative with respect to said anode,
- a first diode having its cathode connected to said gate electrode,
- a second diode having its anode connected to the anode of said first diode,
- first conductor means connected to the juncture of the anodes of said first and second diodes,
- second conductor means connected to the cathode of said second diode,
- a resistor having one end connected to the juncture of said anodes of said first and second diodes,
- switch means connecting the other end of said resistor to ground whereby only when said second conductor is at approximately ground potential will said rectifier conduct.

8. A column buffer storage device, comprising in combination:
- a plurality of silicon controlled rectifiers,
- each of said rectifiers having an anode, a cathode and a gate electrode,
- means connected to the cathode and gate electrode of each of said rectifiers maintaining each cathode at a positive potential relative to its respective gate electrode,
- means connected to the anode of each of said rectifiers maintaining it at a positive potential relative to its respective cathode,
- each of said gate electrodes having first and second diodes connected thereto with the anodes of said first and second diodes connected in back to back relationship and the cathode of said first diode being connected to said gate electrode, resistor means connected between each of the punctures of the anodes of each of said first and second diodes and ground,
- a plurality of conductors respectively connected to the cathode of each of said second diode,
- switch means connecting the other end of each of said resistors to ground whereby when any one of said conductors is at approximately ground potential its associated rectifier conducts.

References Cited by the Examiner

UNITED STATES PATENTS

| | | | |
|---|---|---|---|
| 2,877,359 | 3/1959 | Ross | 307—88.5 |
| 3,034,106 | 5/1962 | Grinich | 307—88.5 |
| 3,081,444 | 3/1963 | Dietrick | 340—146.3 |
| 3,113,241 | 12/1963 | Yonushka | 307—88.5 XR |
| 3,124,636 | 3/1964 | Fitzmaurice | 340—146.3 |
| 3,143,665 | 8/1964 | Smith | 307—88.5 |

ARTHUR GAUSS, *Primary Examiner.*

MALCOLM MORRISON, *Examiner.*

S. URYNOWICZ, J. BUSCH, *Assistant Examiners.*